(12) United States Patent
Meyer et al.

(10) Patent No.: US 7,313,697 B2
(45) Date of Patent: Dec. 25, 2007

(54) METHOD FOR AUTHENTICATION

(75) Inventors: Bernd Meyer, München (DE); Erwin Hess, Ottobrunn (DE)

(73) Assignee: Siemens Aktiengesellschaft, Munich (DE)

(*) Notice: Subject to any disclaimer, the term of this patent is extended or adjusted under 35 U.S.C. 154(b) by 322 days.

(21) Appl. No.: 10/661,341

(22) Filed: Sep. 12, 2003

(65) Prior Publication Data

US 2005/0114662 A1 May 26, 2005

Related U.S. Application Data

(63) Continuation of application No. PCT/DE02/00616, filed on Feb. 20, 2002.

(30) Foreign Application Priority Data

Mar. 12, 2001 (DE) .............................. 101 11 756

(51) Int. Cl.
*H04L 9/00* (2006.01)
*H04L 9/32* (2006.01)

(52) U.S. Cl. .................. 713/168; 380/30; 380/278; 380/286; 713/157; 713/170; 713/180; 726/1; 726/2; 705/60

(58) Field of Classification Search ............ None
See application file for complete search history.

(56) References Cited

U.S. PATENT DOCUMENTS 5,272,755 A * 12/1993 Miyaji et al. .............. 380/30
5,442,707 A * 8/1995 Miyaji et al. .............. 380/30
5,757,918 A * 5/1998 Hopkins .................... 380/30
5,966,445 A * 10/1999 Park et al. ................. 713/180

OTHER PUBLICATIONS

Königs, H.-P.: "Cryptographic Identification Methods for Smart Cards in the Process of Standardization", IEEE Communications Magazine, Jun. 1991, pp. 42-48.
Menezes, A. et al.: "Handbook of Applied Cryptography, Passage", Handbook of Applied Cryptography, CRC Press Series on Discrete Mathematics and its Applications, CRC Press, 1997, pp. 294-296, 400 and 401, 506-508.
A.J. Menezes et al.: "Handbook of Applied Cryptography" *CRC Press series on Discrete Mathematics and its Applications*, CRC Press, Boca Raton, Florida, 1997, pp. 512-515.
Beutelspacher: "Kryptologie", Friedr. Vieweg & Sohn Verlagsgesellschaft mbH, Braunschweig/Wiesbaden, Germany, 1996, ISBN 3-528-48990-1, pp. 90-93.

* cited by examiner

*Primary Examiner*—Gilberto Barrón, Jr.
*Assistant Examiner*—Laurel Lashley
(74) *Attorney, Agent, or Firm*—Laurence A. Greenberg; Werner H. Stemer; Ralph E. Locher

(57) ABSTRACT

A method for authentication and identification uses different keys for the prover and the verifier, but on the other hand dispenses with the utilization of long number modulo arithmetic by the use of simple basic components such as, for example, arithmetic operations in finite bodies $GF(2^n)$. A private key is stored in the prover, so that the latter can receive, in encrypted form, data elements generated as random elements and can itself utilize them again as key for an authentication method of a data set to be transmitted. The verifier receives the authenticator thus formed and checks it. If the data set is generated by the verifier and transmitted to the prover, then this method can serve for the identification of the prover. The method is particularly advantageous in the area of smart cards, since there the required space in the hardware implementation can be considerably reduced.

18 Claims, 1 Drawing Sheet

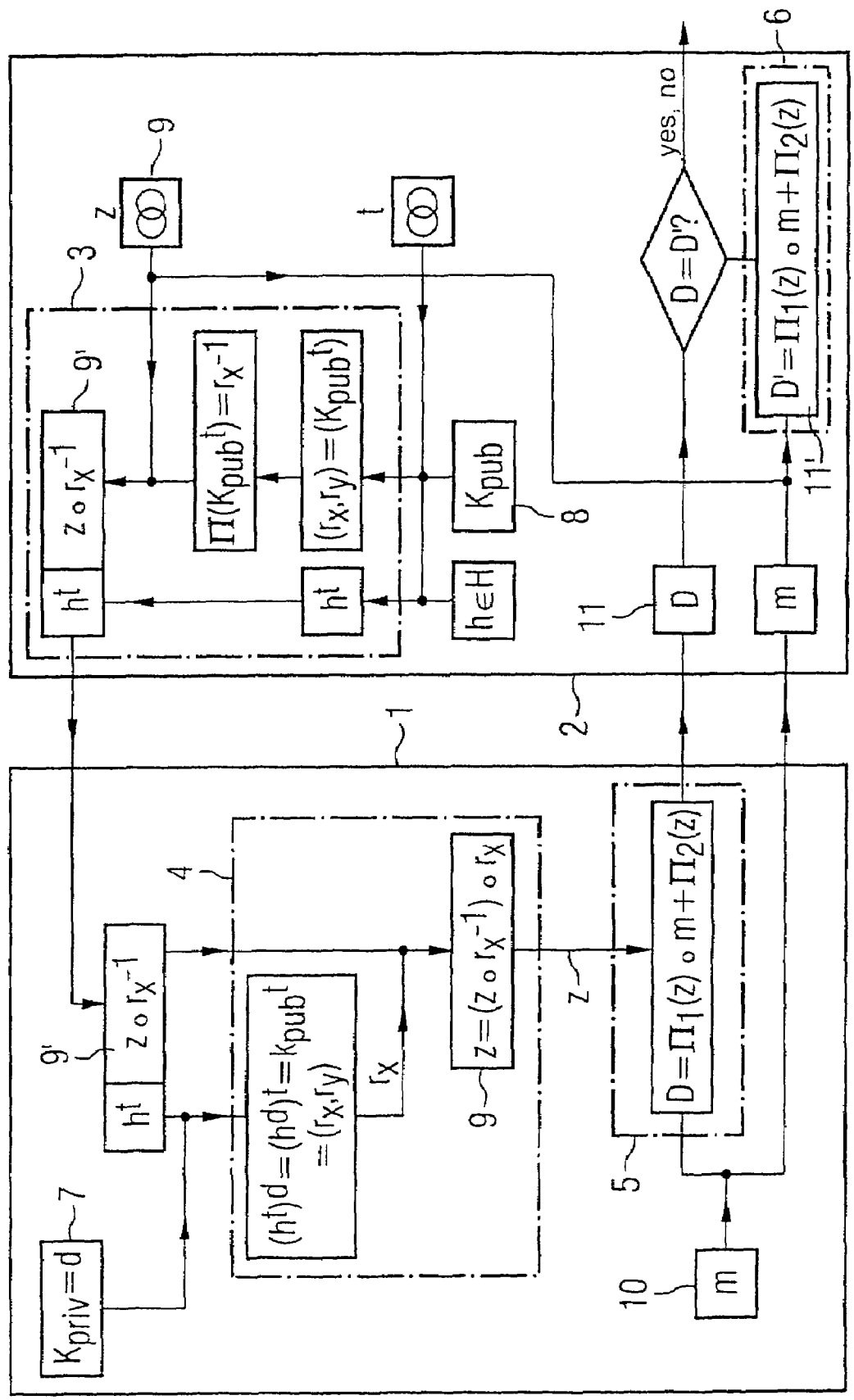

METHOD FOR AUTHENTICATION

CROSS-REFERENCE TO RELATED APPLICATION

This application is a continuation of copending International Application No. PCT/DE02/00616, filed Feb. 20, 2002, which designated the United States and was not published in English.

BACKGROUND OF THE INVENTION

Field of the Invention

The present invention relates to a method for the authentication of a data set between a proving unit and a verifying unit.

In the area of the use of smart cards as credit, debit, cash, identification, access or time control cards, etc. or as message carriers, for instance, the question of protecting the information present on the card against an unauthorized access by third parties constitutes a central problem. A particular aspect here is also the protected data transmission between the smart card and e.g. the card adapter device (CAD) of a smart card terminal. This is made possible by the process of so-called authentication of the units involved, in this case the smart card and the terminal: e.g. the terminal acquires adequately protected proof of the identity of the smart card that is in a protocol with it. As a counterpart move, by a corresponding process, the smart card can also acquire certainty about the identity of the terminal at the instant of the mutual checking. The same also applies correspondingly to the authenticity of the transmitted data.

The proof of identity can be furnished by the exchange of secret items of information known only to the units involved. A distinction is made here between so-called weak and strong authentication. In the case of the former, e.g. the user of a magnetic strip card enters a password or a PIN via a keyboard and thus authenticates himself as the legitimate owner of the card. The secret is transmitted in the process. In the case of strong authentication, in a so-called challenge-response method, a unit that verifies the identity of the protocol partner (this unit being called a verifier below) exchanges authentication information in a dialogue with the unit that proves its identity (called prover below), which authentication information verifies the presence of a secret but without divulging it to an attacker. In this case, the protocol method between the units is usually defined a priori.

If, after or instead of items of information about the identity of the units involved, only data are transferred which are subject to a similarly high security requirement, then mention may also be made in a generalized manner of a data authentication, using an analogous protocol method. A known example in this respect is, for instance, the amounts of money still present on telephone cards, which are communicated authentically to the telephone terminal by the card.

In the case of strong authentication, which is particularly important for smart cards, essentially two approaches have taken shape for different applications. The use of symmetrical authentication methods for exchanging identity identifiers and data is known from the use in telephone cards (cash cards). The basic principle is that, for the authentication of the card (of the prover) with respect to the terminal (the verifier), the latter first transmits a random number to the card, which calculates an authentication value from the random number with a secret key known to both units using a suitable method and then transmits it back to the terminal. The latter, by comparing the calculations carried out with its key with the originally transmitted random number, recognizes whether the card has used the authorized key. For this purpose, the card and terminal manufacturer often uses the so-called master key concept, in which the master key is stored in each terminal, from which master key the individual key assigned to the card during the card coding (card personalization) can be calculated from its identity code number by an algorithm. An older known standard in this respect is the data encryption standard (DES).

If an attacker succeeds in gaining possession of the master key, then the problem arises that the entire system is laid open to the attacker. This disadvantage could be avoided by using key pairs stored individually for each card, but this is impracticable for example due to the high number of telephone cards and hence keys that are in circulation. In the case of telephone cards, a laborious implementation used nowadays involves further cryptographic measures that also contain a change and a restricted validity of the master keys.

An alternative to the symmetrical methods is to send digital signatures in asymmetrical methods. The verifier (the terminal) generates a random number and transmits it to the prover (the card). The latter signs the random number by a method for generating digital signatures using a private key—known only to it—of a key pair—the public key is available both to the prover and, in particular, to the verifier. Having been transmitted back to the verifier, the digital signature is checked for its correctness using the public key, the verifier not acquiring knowledge of the private key but rather only obtaining the information that the prover possesses the private key and is thus authenticated. An algorithm often used for this method originates from Rivest, Shamir and Adleman (RSA).

Unfortunately, the methods using digital signatures necessitate a high computational complexity due to the long number modulo arithmetic on the part of the prover, that is to say e.g. on a smart card. Here, typically, two very large numbers have to be multiplied together and be reduced (brought back to the original size) again in modular fashion. As a result, the hardware implementation on the chip of a smart card on the one hand leads to a more costly smart card production or else to unacceptably long computation and response times.

SUMMARY OF THE INVENTION

It is accordingly an object of the invention to provide a method for authentication that overcomes the above-mentioned disadvantages of the prior art methods of this general type, which reduces the costs and the technical implementation outlay in the authentication of data, in particular also in the identification of the units involved.

With the foregoing and other objects in view there is provided, in accordance with the invention, a method for authenticating a data set between a proving unit and a verifying unit. The method includes the steps of:

a) communicating the data set from one of the proving and verifying units to a respective other of the proving and verifying units such that the data set is in an unencrypted form to both the proving and verifying units after completing the communicating step;

b) generating at least one data element in the verifying unit;

c) using the verifying unit to encrypt the data element in a first cryptographic encryption method using a public key of the proving unit resulting in at least one encrypted data element, and the public key is known to the verifying unit;

d) communicating the encrypted data element from the verifying unit to the proving unit;

e) using the proving unit to decrypt the encrypted data element in a first decryption method, assigned to the first encryption method, using a private key known only to the proving unit;

f) using the proving unit to calculate, from the data set to be authenticated, in a second cryptographic method, an authenticator dependent on the data element;

g) communicating the authenticator from the proving unit to the verifying unit;

h) using the verifying unit to check the authenticator with an aid of an authentication checking algorithm, assigned to the second cryptographic method using the data element and the data set; and i) accepting the data set as communicated by the proving unit to the verifying unit in dependence on a result of the checking step.

According to the present invention, a dialogue is introduced in which a proving unit proves to a verifying unit, using asymmetrical cryptographic keys, the authenticity of the data that it communicates. In particular, it can also prove its own identity in the process. Modules which come directly into contact with one another are considered as units, in which case any desired transmission path, e.g. electronically, light-optically, acoustically etc., can be used, and the modules are systems containing integrated circuits, e.g. smart cards, card terminals, data processing systems such as personal computers or servers, etc.

In the method, a pair of public and private keys is used, of which the private key is known only to the proving unit, the prover, while the public key matching the private key is stored in both units and can be realized either by a message transmitted before hand or a prior installation or by an online connection to a central server on the part of the verifying unit, the verifier.

An essential substep of the method is that the data set that is intended to be authenticated is provided in plain text to both units involved, the prover and the verifier. The transmission in this respect can be effected in an encrypted or unencrypted manner. In the case of data authentication, the data set is typically present first at the prover, the latter then communicating the data set to the verifier, whereas, in the case of the unit authentication, the data set can also be communicated from the verifier to the prover.

In steps b) to e), that is to say in the first part of the dialogue, the verifier provides the prover with at least one data element in encrypted form, the data element serving as a symmetrical key known only to the two units in the second part of the dialogue. This corresponds first to an asymmetrical method, because the prover uses its private key in order to decipher the data element. Although the prover has a private key as in a conventional asymmetrical challenge-response protocol, in contrast thereto, according to the invention, it does not use the private key to form a digital signature, but rather only to decrypt the received at least one data element, which itself later serves as a key. In terms of their temporal sequence, steps b) to e) follow the order specified in the claim.

After step e) the two units possess the plain text of the at least one data element. It is appropriate to exchange more than just one data element if multiple combinations of the data set that is actually to be authenticated with the plurality of data elements are to be carried out in the application of an algorithm provided in the subsequent steps.

The sequences of steps required in each case for the generation, encryption, transmission and decryption of the plurality of data elements can be performed in any desired temporal assignment with respect to one another. The relative temporal assignment is thus unimportant; however, all the data elements must be present in unencrypted form at the prover at the beginning of step f).

In step f), the data set to be authenticated is authenticated with the assistance of the data element. This may again involve an asymmetrical second cryptographic method, specifically if the data element has been generated by the verifier as a public key with respect to a further private key known only to the verifier. However, a symmetrical second cryptographic method AUTGEN is preferably used here. The transformed data set—called authenticator here—formed from the data set to be authenticated by use of AUTGEN in a manner dependent on the data element is transmitted to the verifier again by the prover.

The verifier thus possesses the information about the data set, the symmetrical key, i.e. the data element which it itself transmitted, the authenticator and also an authentication checking algorithm coordinated with the AUTGEN method. This can check for the correctness of the received authenticator of the prover with the original data set using the symmetrical key present.

In the final step, the verifier evaluates the comparison: if the received authenticator and the original data set match, then the message is deemed to be communicated by the prover. Further communication steps can then follow. In the event of non-correspondence, the verifier can preferably terminate the communication.

The method gives rise to a major advantage by virtue of the fact that the properties of the public key approach, that is to say of the asymmetrical methods, which are superior to the symmetrical methods in the security sense, are utilized without incurring the technical implementation outlay customary heretofore, because, in the case of the method according to the invention, it is no longer necessary to provide a computationally intensive long number modulo arithmetic. An advantage that arises particularly in the case of smart cards is that the private key has to be permanently stored only on the part of the prover, that is to say the card in this case, without the verifier attaining knowledge of the key in the course of the dialogue. As a result of an implementation with computation methods founded on one another, the space required for the hardware implementation on the chip of a smart card can be considerably reduced.

According to a further embodiment, in step a), the data set is communicated from the prover to the verifier in unencrypted form, that is to say as plain text. This step takes place before step h), for time reasons ideally together with the transmission of the authenticator directly before or after step g). This method embodiment is particularly favorable for the data authentication.

According to a further embodiment, in step a), the data set is generated as random element by the verifier and communicated to the prover. It is advantageous to carry out the communication asymmetrically in encrypted form, since then the data set itself is also not accessible to a potential attacker. In the case of the encrypted communication, it is possible to use the same algorithm and the same key pairs as in steps b) to e), as a result of which a space-saving realization is made possible, primarily in the case of smart cards, in the case of the hardware implementation. On the other hand, in this case no original data are communicated from the prover to the verifier, so that this embodiment is particularly advantageously suitable for the unit authentication. Step a) is performed at any desired step position before step f) in this embodiment.

As is described in a further embodiment, the authentication checking algorithm AUTVER may correspond to the same algorithm as the previously employed method AUTGEN. The actual authentication check is then carried out by the verifier in a similar manner to the authenticator generation AUTGEN by the application of the authentication algorithm to the data set in plain text with the at least one data element as key: the result is identical to the authenticator sent by the prover only if the latter is evidently the owner of the private key associated with the first asymmetrical encryption method. In this case, the verifier accepts the message as communicated by the prover.

In a further embodiment, the authentication algorithm from step h) is formed as a second decryption method which can decrypt messages encrypted by the second encryption method. Using the at least one data element serving as a key, the verifier can decrypt the authenticator and thus obtains a data set which can be compared with the data set originally communicated in plain text.

As is provided in a further embodiment, in the case where a plurality of data elements are transmitted and used for the second encryption in step f) at the prover, steps b) to e) can also be performed blockwise for an individual data element, after the performance of which the same steps are performed again for the next data element, etc. This then corresponds to a repetition of steps b) to e) with the frequency of the data elements used.

A further configuration provides the use of discrete exponentiation for the first encryption and decryption method. This is particularly advantageous since, on the one hand, it enables a high degree of security because—given a suitable choice of the algebraic base structure used—the problem of the discrete logarithm can be dealt with by attackers only through solution techniques whose complexity rises to a particularly great extent with the magnitude of the exponent. At the same time, only little memory space is required on e.g. a smart card.

Further configurations describe particularly advantageously embodied algorithms for the encryption and decryption methods and also the authenticator generation and checking. In this case, the individual submodules that are coordinated with one another are realized by specific groups and semigroups. As a result of this, on the one hand, the laborious long number modulo arithmetic, which requires a considerable amount of space on a chip according to the prior art, is obviated and, on the other hand, the at least four modules or algorithms mentioned can thus be realized in a common base in terms of hardware, which likewise saves space, if appropriate, on the chip.

In accordance with an added mode of the invention, during the first cryptographic encryption method, the verifying unit generates a number $t \in T$, where T is a subrange of integers. The verifying unit calculates element $h^{f(t)} \in H$, where $f: T \to T'$ is a mapping into a subrange T' of the integers, which is not necessarily different from T, H represents a multiplicatively written semigroup generated by element h, with a discrete exponentiation of a base h as a one-way function in the semigroup H. The verifying unit calculates from the public key, $k_{pub} = h^{f(d)} \in H$, element $\pi(k_{pub}^{f(t)}) \in G$, where $\pi: H \to G$ specifies a mapping of the semigroup H into a group G, $d \equiv k_{priv} \in T$ is the private key which is accessible only to the proving unit, and a mapping $t \to h^{f(t)} \to \pi(h^{f(t)})$ from the subrange of the integers T to the group G represents a one-way function. The verifying unit encrypts the data element, z, by a combination with respect to the encrypted data element, $z' = z \circ \pi(k_{pub}^{f(t)}) \in G$.

In accordance with an additional mode of the invention, during the step d), in addition to the encrypted data element, the verifying unit communicates the element $h^{f(t)} \in H$ to the proving unit.

In accordance with a further mode of the invention, during the first cryptographic decryption method the proving unit calculates the element $k_{pub}^{f(t)} \in H$ using function f, the element $h^{f(t)} \in H$ and the private key d known only to the proving unit. The proving unit calculates an inverse element $\pi'(k_{pub}^{f(t)}) \in G$ with respect to element $\pi(k_{pub}^{f(t)}) \in G$. The proving unit decrypts the encrypted data element by a combination of the encrypted data element with inverse element: $z = z' \circ \pi'(k_{pub}^{f(t)})$, where the first cryptographic decryption method is based on the same mappings f, $\pi$ and the same combination $\circ$ as the first cryptographic encryption method.

In accordance with another mode of the invention, during the second cryptographic method, the proving unit calculates, from the at least one unencrypted data element z, an element $g_2 = \pi_1(z) \in G_1$ and an element $g_2 = \pi_2(z) \in G_2$, where $G_1$ and $G_2$ represent groups where $G_1 \subset G_2$ and $\pi_1: G \to G_1$ and $\pi_2: G \to G_2$ represent functions which map elements of the group G onto the groups $G_1$ or $G_2$. The proving unit transforms the data set to be authenticated m, to form an element $g' = (g_1 * m)$ with a group combination * in $G_1$. The proving unit calculates the authenticator D, by $D = inj(g') \bullet g_2$ with the group combination $\bullet$ in $G_2$, where the mapping inj: $G_1 \to G_2$ maps elements from $G_1$ injectively into $G_2$.

Other features which are considered as characteristic for the invention are set forth in the appended claims.

Although the invention is illustrated and described herein as embodied in a method for authentication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram showing a sequence for authenticated data transmission between a proving unit and a verifying unit according to the invention.

DESCRIPTION OF THE PREFERRED EMBODIMENTS

Referring now to the single FIGURE of the drawing in detail, there is shown a smart card inserted into a card adapter device (CAD) of a terminal. The terminal first obtains from the smart card a public key 8 of the smart card provided with the certificate of a trust center. The smart card or the integrated circuit on the smart card hereinafter undertakes the task of the prover or proving unit 1, since it has to prove its identity and the authenticity of its data with respect to the terminal, which hereinafter undertakes the position of the verifier or verifying unit 2. The text below describes, according to the invention, the authenticated communication of a data set from the prover 1 to the verifier 2.

The prover 1 additionally holds a private key 7 known only to it, which key forms a pair with the public key 8. The verifier 2 has an encryption unit 3 performing a first encryption method, by which data elements 9 generated as random elements can be encrypted to form a ciphertext or encrypted data element 9'. The encryption method furthermore includes semigroup elements and random numbers additionally generated by the verifier 2 for the discrete exponentiation. For the first encryption method and also for the further algorithms yet to be described, the exemplary embodiment utilizes the following instances based on groups and semigroups, in which case all combinations of the objects that occur can be taken back to the arithmetic in finite bodies $GF(2^n)$:

H: a group of points generated from a point h on an elliptical curve over $GF(2^n)$, in particular H being a semigroup;

f: is an identical mapping;

$d \equiv k_{priv}$ is the private key 7;

$k_{pub} = h^d$ is the public key 8;

G: is a multiplicative group in $GF(2^n)$;

$G_1$: is the multiplicative group in $GF(2^m)$, where $$m = \frac{n-1}{2},$$

n odd $G_2$: is the additive group in $GF(2^m)$;

$\pi$: H→G is a function which maps a curve point $(p_x, p_y)$ of the elliptical curve where $p_x \neq 0$ onto the element $p_x^{-1}$.

$\pi_1$: G→$G_1$ $\pi_1(z)$ contains the upper m bits of z; and $\pi_2$: G→$G_2$ $\pi_2(z)$ contains the lower m bits of z.

The protocol sequence appears as follows:

Step 1 (step b): the verifier 2 generates a random number t and a random element $z_1 \in G$ as the data element 9;

Step 2 (step c):

i) the verifier 2 calculates, in the first encryption method, the elements $h^t$ and $k_{pub}^t = r = (r_x, r_y) \in H$;

ii) the verifier 2 calculates, in the first encryption method, from the public key 8 of $k_{pub}$ the element $\pi(k_{pub}^t) = r_x^{-1} \in G$;

iii) the verifier 2 encrypts the data element 9 in the first encryption method by the combination $z_1 \circ r_x^{-1} \in G$;

Step 3 (step d): the verifier 2 communicates as ciphertext the encrypted data element 9' and the element $h^t$;

Step 4 (step e):

i) the prover 1 calculates the curve point using the transmitted element $h^t$ in a first decryption method performed by a decryption unit 4 using of the private key 7 by $(h^t)^d = (h^d)^t = k_{pub}^t = (r_x, r_y)$, without itself having knowledge of t;

ii) the prover 1 calculates the unencrypted data element 9 using the encrypted data element 9' and the calculated element $r_x$ from the transmitted ciphertext in the first decryption method where $z_1 = (z_1 \circ r_x^{-1}) \circ r_x \in G;$ Step 5 (step a): the data set 10 with a value m, is transmitted in plain text from the prover 1 to the verifier 2;

Step 6 (step f): the prover 1 forms an authenticator 11, which is also designated by D in FIG. 1, in the second encryption method 5 by the combination:

$D = \pi_1(z_1) \circ m + \pi_2(z_1)$ using the data elements 9, which are now used as keys;

Step 7 (step g): the prover 1 communicates the authenticator 11 to the verifier 2;

Step 8 (step h): the verifier 2 calculates a reference authenticator 11' in an authentication algorithm unit 6 performing an authentication algorithm from the combination $D' = \pi_1(z_1) \circ m + \pi_2(z_1)$, the authentication algorithm performing the same computation operations as a second cryptographic method;

Step 9 (step i): the verifier 2 checks the identity of the authenticator 11 using the reference authenticator 11': if D=D', the data set 10 with value m is accepted as communicated by the prover 1.

We claim:

1. A method for authenticating a data set between a proving unit and a verifying unit, which comprises the steps of:

a) communicating the data set from one of the proving and verifying units to a respective other of the proving and verifying units such that the data set is in an unencrypted form to both the proving and verifying units after completing step a);

b) generating at least one data element in the verifying unit;

c) using the verifying unit to encrypt the data element in a first cryptographic encryption method using a public key of the proving unit resulting in at least one encrypted data element, and the public key is known to the verifying unit, performing the first cryptographic encryption method using discrete exponentiation in a semigroup with the steps of:

using the verifying unit to generate a number $t \in T$, where T is a subrange of integers;

using the verifying unit to calculate element $h^{f(t)} \in H$, where f:T→T' is a mapping into a subrange T' of the integers, which is not necessarily different from T, H represents a multiplicatively written semigroup generated by element h, with a discrete exponentiation of a base h as a one-way function in the semigroup H;

using the verifying unit to calculate from the public key, $k_{pub} = h^{f(d)} \in H$, element $\pi(k_{pub}^{f(t)}) \in G$, where $\pi$:H→G specifies a mapping of the semigroup H into a group G, $d \equiv k_{priv} \in T$ is the private key which is accessible only to the proving unit, and a mapping $t \to h^{f(t)} \to \pi(h^{f(t)})$ from the subrange of the integers T to the group G represents a one-way function; and using the verifying unit to encrypt the data element, z, by a combination with respect to the encrypted data element, $z' = z \circ \pi(k_{pub}^{f(t)}) \in G$;

d) communicating the encrypted data element from the verifying unit to the proving unit;

e) using the proving unit to decrypt the encrypted data element in a first decryption method, assigned to the first cryptographic encryption method, using a private key known only to the proving unit and using discrete exponentiation in a semigroup;

f) using the proving unit to calculate, from the data set to be authenticated, in a second cryptographic method, an authenticator dependent on the data element;

g) communicating the authenticator from the proving unit to the verifying unit;

h) using the verifying unit to check the authenticator with an aid of an authentication checking algorithm, assigned to the second cryptographic method using the data element and the data set; and i) accepting the data set as communicated by the proving unit to the verifying unit is dependent on a result of the check performed in step h).

2. The method according to claim 1, which further comprises during the step a), using the proving unit to communicate the data set in unencrypted form to the verifying unit.

3. The method according to claim 1, which further comprises using the verifying unit to generate the data set as a random element and subsequently, in the step a), communicating the data set to the proving unit.

4. The method according to claim 1, which further comprises during the step h):
forming the authentication checking algorithm to be substantially identical to the second cryptographic method for authenticator generation;
applying the authentication checking algorithm by the verifying unit to the data element and the data set for forming a reference authenticator; and
comparing the reference authenticator with the authenticator.

5. The method according to claim 1, which further comprises during the step h):
forming the authentication checking algorithm with a decryption method corresponding to the second cryptographic method for generating the authenticator for an associated encryption method;
applying the authentication checking algorithm by the verifying unit to the authenticator by decryption for forming a reference data element and a reference data set; and
comparing the reference data element and the reference data set with the data element and the data set.

6. The method according to claim 1, which further comprises:
repeating steps b), c), d) and e) for generating at least one further data element before performing the step f); and
using the proving unit to encrypt the data set to be authenticated in step f) in a manner dependent on the data element and the further data element to form the authenticator.

7. The method according to claim 1, which further comprises during the step d), in addition to the encrypted data element, using the verifying unit to communicate the element $h^{f(t)} \in H$ to the proving unit.

8. The method according to claim 7, which further comprises performing the first cryptographic decryption method by the steps of:
using the proving unit to calculate the element $k_{pub}^{f(t)} \in H$ using function f, the element $h^{f(t)} \in H$ and the private key d known only to the proving unit;
using the proving unit to calculate an inverse element $\pi'(k_{pub}^{f(t)}) \in G$ with respect to element $\pi(k_{pub}^{f(t)}) \in G$; and
using the proving unit to decrypt the encrypted data element by a combination of the encrypted data element with inverse element: $z=z' \circ \pi'(k_{pub}^{f(t)})$, where the first cryptographic decryption method is based on the same mappings f, $\pi$ and the same combination $\circ$ as the first cryptographic encryption method.

9. The method according to claim 8, which further comprises performing the second cryptographic method with the steps of:
using the proving unit to calculate, from the at least one unencrypted data element z, an element $g_2=\pi_1(z) \in G_1$ and an element $g_2=\pi_2(z) \in G_2$, where $G_1$ and $G_2$ represent groups where $G_1 \subset G_2$ and $\pi_1:G \to G_1$ and $\pi_2:G \to G_2$ represent functions which map elements of the group G onto the groups $G_1$ or $G_2$;
using the proving unit to transform the data set to be authenticated m, to form an element $g'=(g_1*m)$ with a group combination * in $G_1$; and
using the proving unit to calculate the authenticator D, by $D=inj(g') \bullet g_2$ with the group combination $\bullet$ in $G_2$, where the mapping $inj:G_1 \to G_2$ maps elements from $G_1$ injectively into $G_2$.

10. The method according to claim 1, which further comprises performing the following steps before performing step b):
using the proving unit to communicate the public key with a certificate of a trust center;
using the verifying unit to check a validity of the public key of the proving unit using a certification method; and
using the verifying unit to continue the communication with the proving unit in a manner dependent on a result of the check.

11. The method according to claim 1, which further comprises:
forming the proving unit as an integrated circuit on a smart card; and
forming the verifying unit as a smart card terminal.

12. The method according to claim 1, which further comprises forming the proving unit as an integrated circuit in an identification/authentication token which is fixedly connected to a non localized object.

13. The method according to claim 11, which further comprises performing the communication between the proving unit and the verifying unit contactlessly.

14. A method for authenticating a data set between a proving unit and a verifying unit, which comprises the steps of:
a) communicating the data set from one of the proving and verifying units to a respective other of the proving and verifying units such that the data set is in an unencrypted form to both the proving and verifying units after completing step a);
b) generating at least one data element in the verifying unit;
c) using the verifying unit to encrypt the data element in a first cryptographic encryption method using a public key of the proving unit resulting in at least one encrypted data element, and the public key is known to the verifying unit, performing the first cryptographic encryption method using discrete exponentiation in a semigroup and an algorithm based on elliptical curves with the steps of:
using the verifying unit to generate a number $t \in T$, where T is a subrange of integers;
using the verifying unit to calculate element $h^{f(t)} \in H$, where $f:T \to T'$ is a mapping into a subrange T' of the integers, which is not necessarily different from T, H represents a multiplicatively written semigroup generated by element h, with a discrete exponentiation of a base h as one-way function in the semigroup H;
using the verifying unit to calculate from the public key, $k_{pub}=h^{f(d)} \in H$, element $\pi(k_{pub}^{f(t)}) \in G$, where $\pi$:

$H \to G$ specifies a mapping of the semigroup H into a group G, $d = k_{priv} \in T$ is the private key which is accessible only to the proving unit, and a mapping $t \to h^{f(t)} \to \pi(h^{f(t)})$ from the subrange of the integers T to the group G represents a one-way function; and using the verifying unit to encrypt at least one data element, z, by a combination with respect to the encrypted data element, $z' = z \circ \pi(k_{pub}^{f(t)}) \in G$;

d) communicating the encrypted data element from the verifying, unit to the proving unit;

e) using the proving unit to decrypt the encrypted data element in a first decryption method, assigned to the first cryptographic encryption method, using a private key known only to the proving unit and using discrete exponentiation in a semigroup being an algorithm based on elliptical curves;

f) using the proving unit to calculate, from the data set to be authenticated, in a second cryptographic method, an authenticator dependent on the data element;

g) communicating the authenticator from the proving unit to the verifying unit;

h) using the verifying unit to check the authenticator with an aid of an authentication checking algorithm, assigned to the second cryptographic method using the data element and the data set; and i) accepting the data set as communicated by the proving unit to the verifying unit is dependent on a result of the check performed in step h).

15. The method according to claim 14, which further comprises during the step d), in addition to the encrypted data element, using the verifying unit to communicate the element $h^{f(t)} \in H$ to the proving unit.

16. The method according to claim 15, which further comprises performing the first cryptographic decryption method by the steps of:

using the proving unit to calculate the element $k_{pub}^{f(t)} \in H$ using function f, the element $h^{f(t)} \in H$ and the private key d known only to the proving unit;

using the proving unit to calculate an inverse element $\pi'(k_{pub}^{f(t)}) \in G$ with respect to element $\pi(k_{pub}^{f(t)}) \in G$; and using the proving unit to decrypt the encrypted data element by a combination of the encrypted data element with inverse element: $z = z' \circ \pi'(k_{pub}^{f(t)})$, where the first cryptographic decryption method is based on the same mappings f, $\pi$ and the same combination a as the first cryptographic encryption method.

17. The method according to claim 16, which further comprises performing the second cryptographic method with the steps of:

using the proving unit to calculate, from the at least one unencrypted data element z, an element $g_2 = \pi_1(z) \in G_1$ and an element $g_2 = \pi_2(z) \in G_2$, where $G_1$ and $G_2$ represent groups where $G_1 \subset G_2$ and $\pi_1 : G \to G_1$ and $\pi_2 : G \to G_2$ represent functions which map elements of the group G onto the groups $G_1$ or $G_2$;

using the proving unit to transform the data set to be authenticated m, to form an element $g' = (g_1 * m)$ with a group combination * in $G_1$; and using the proving unit to calculate the authenticator D, by $D = inj(g') \bullet g_2$ with the group combination $\bullet$ in $G_2$, where the mapping $inj : G_1 \to G_2$ maps elements from $G_1$ injectively into $G_2$.

18. The method according to claim 12, which further comprises performing the communication between the proving unit and the verifying unit contactlessly.

* * * * *